UNITED STATES PATENT OFFICE.

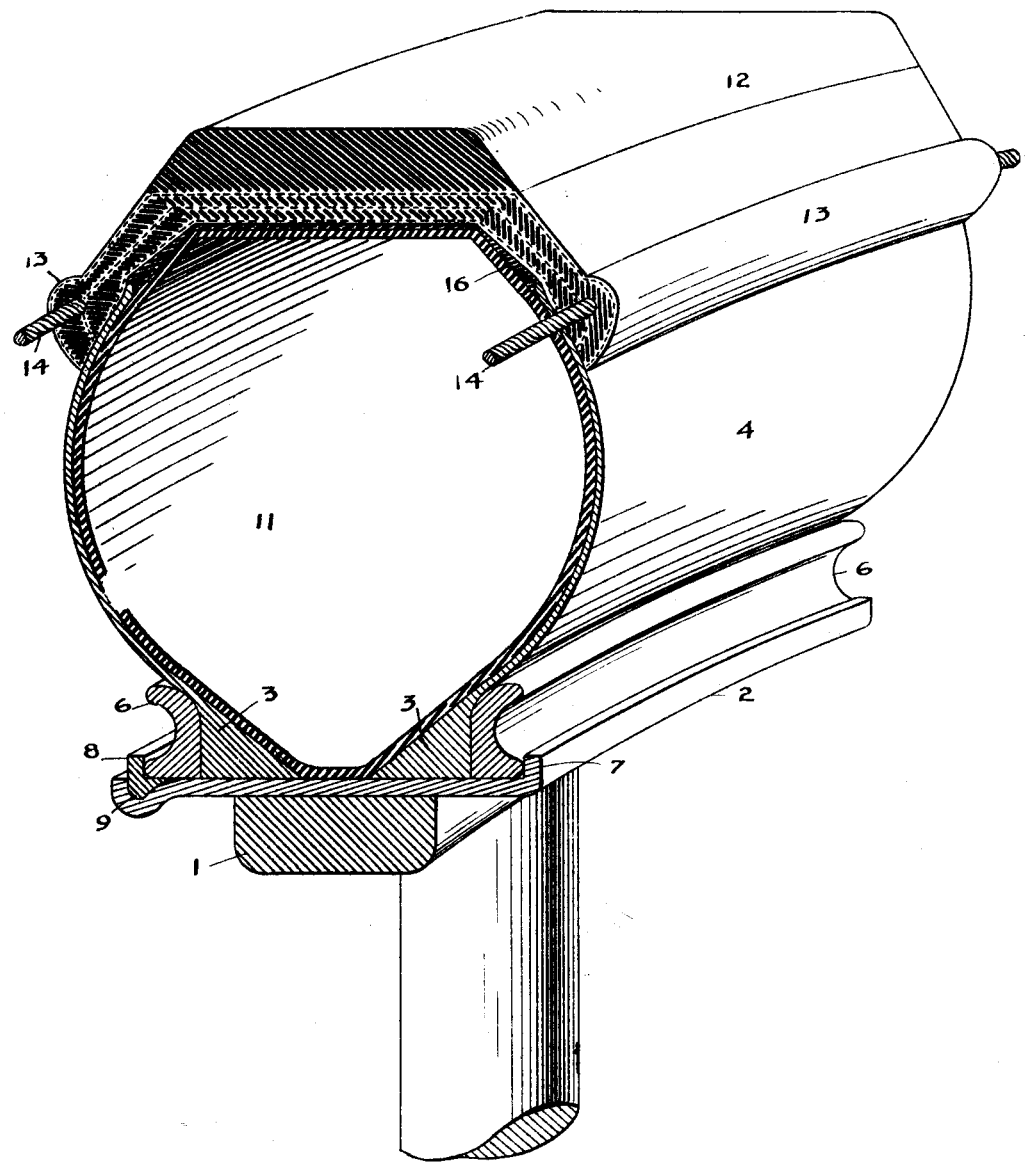

CALVIN P. HENSLEY, OF SAN FRANCISCO, CALIFORNIA.

PNEUMATIC TIRE.

1,198,634.  Specification of Letters Patent.  Patented Sept. 19, 1916.

Application filed April 26, 1915. Serial No. 23,855.

*To all whom it may concern:*

Be it known that I, CALVIN P. HENSLEY, a citizen of the United States, residing at San Francisco, in the county of San Francisco and State of California, have invented new and useful Improvements in Pneumatic Tires, of which the following is a specification.

The present invention relates to improvements in pneumatic tires, the object of the invention being to provide a pneumatic tire which will be well able to withstand punctures by nails and to be more durable, in which the tendency to blow-outs will be greatly reduced, in which there will be no rim cutting and the cost of maintenance will be greatly reduced.

In the accompanying drawing, the figure is a sectional perspective view of my improved pneumatic tire.

Referring to the drawing, 1 indicates a wooden felly of a wheel, around which is a metallic rim 2 to which thickened inner portions 3 of side metallic shields 4 are held by clencher rings 6, held in place on the one side by an outwardly extending flange 7 of the metallic rim 2 and on the other side by a locking ring 8 in a groove 9 in said metallic rim. 11 indicates the inner tube contained between said side shields and 12 is the flexible tread having side portions 13 reinforced by wire rings 14. A filler 16 of soft rubber extends from the outer edges of the metallic side shields and fills up the corners in which otherwise the inner tube might have been pinched.

The following are the important features of my invention which distinguish it from the prior art:

First, the parts are of such dimensions that the inner tube can, when inflated, extend outward from the center of the wheel a distance considerably greater than the outer edges of the metallic side shields. This arrangement permits of the necessary movement of the tread inward, or toward the center of the wheel, and at the bottom of the wheel the accompanying compression of the inner tube by the load.

Second, the inner edges of the side portions of the tread are nearer to the center of the wheel than the outer edges of the side shields by a distance sufficiently great to prevent said inner edges slipping over the outer edges of the side shields. Consequently the side shields are retained in place merely by inflation of the inner tube and without the necessity of hooks or other means of securing them together.

There are many advantages in a flat tread over a convex tread. In the first place, as is obvious, the extent of surface in contact with the ground is very much greater in a flat tread than in a convex tread, there being only a small central portion of the convex tread in contact with the ground, whereas practically the whole width of the flat tread is in contact therewith. A further advantage is that, in a convex tread, the pressure of the ground on its outside portion which is in contact therewith, is directed not directly upward, but in a direction outward as well as upward, or, in other words, in a direction not exactly normal to the inner portion of the tread, but obliquely to the normal. At the same time the direction of the resistance offered by the inner portion of the tread is exactly normal to said inner portion, and therefore not opposite to the pressure on the outside portion. Consequently there is a shearing action at the surface of juncture between the inside portion, which contains layers of canvas mesh, and the outside portion, composed almost entirely of rubber. This shearing action has a tendency to separate the outer rubber portion from the canvas mesh portion. In my invention such action does not occur because the pressure of the ground upon the tread is directly upward, and is exactly opposite to the outward pressure on the inside portion of the tread due to the compressed air therewithin.

It is to be understood therefore that it is an important feature of my invention that the inner edges of the metal side shields be held loosely in the rim.

I claim:—

In combination with a rim of a wheel and an inner tube of a pneumatic tire, a rubber tread, and separately detachable annular metal side shields for said tube, their inner edges having parts slidably engaging the outer surface of the rim of the wheel, the side portions of the tread extending over the outer portions of the side shields, and the edges of the tread being of less diameter than the outer edges of the side shields, and the inner central surface of the tread being of sufficiently greater diameter than that of the side shields to allow sufficient movement of the tread to correspond with the compression of the inflated inner tube by the load.

In testimony whereof I have hereunto set my hand in the presence of two subscribing witnesses.

CALVIN P. HENSLEY.

Witnesses:
F. N. WRIGHT,
D. B. RICHARDS